Sept. 2, 1930.   H. L. LAMBERT   1,774,927
HOUSEHOLD COFFEE URN
Filed Sept. 5, 1929
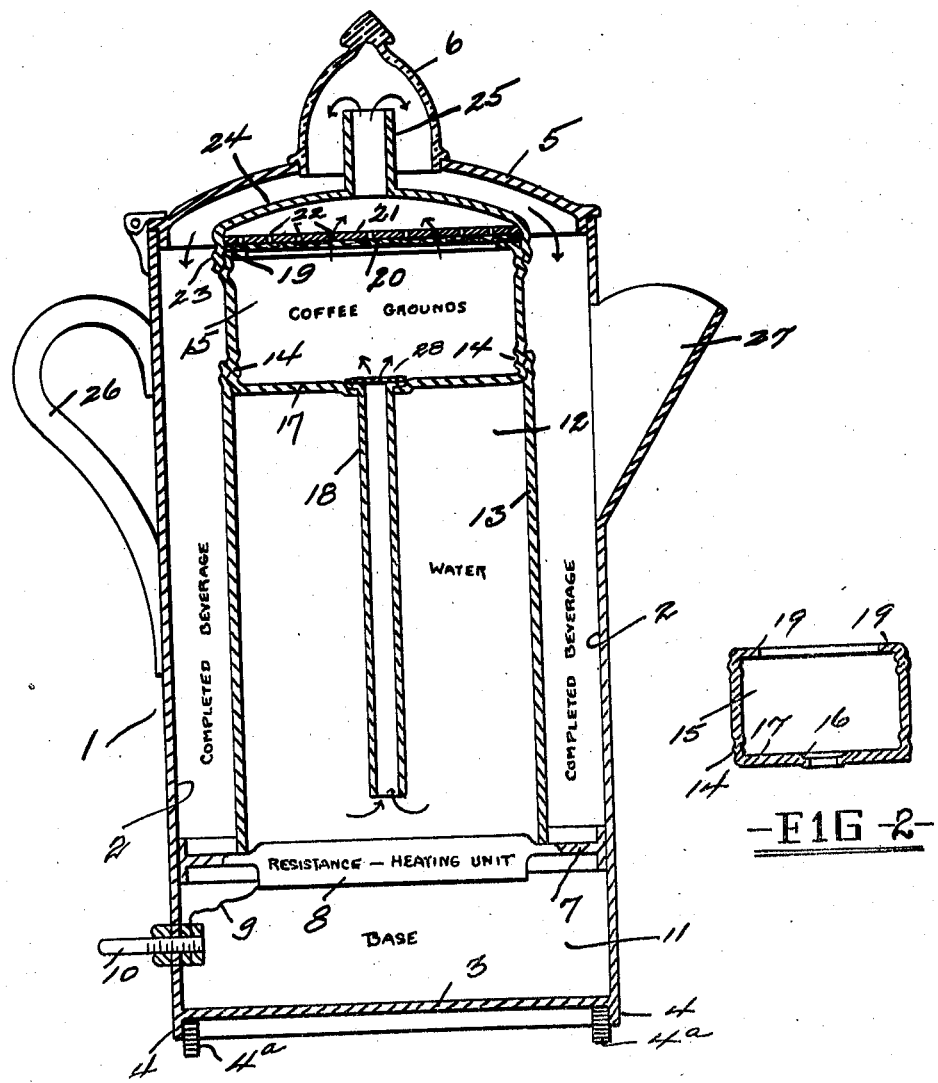
FIG-1-
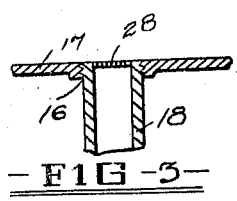
FIG-3-
INVENTOR.
H. L. LAMBERT
BY Alfred C. Fardel,
ATTORNEY.

Patented Sept. 2, 1930

1,774,927

UNITED STATES PATENT OFFICE

HARRY L. LAMBERT, OF NORTH BERGEN, NEW JERSEY

HOUSEHOLD COFFEE URN

Application filed September 5, 1929. Serial No. 390,534.

The coffee bean, when roasted, contains among other things, two products or constituents. One of these is caffeine, and it is this element that produces the delightful, pleasing coffee taste that appeals to all coffee drinkers, and the greater the percentage of caffeine extracted when the coffee is brewed the better the resulting beverage; the desirable end to be obtained is the complete extraction of caffeine from the roasted bean. The other element is tannin, which has a stinging, bitter and undesirable taste and should be eliminated as far as possible from the resulting brew or beverage. It has been estimated that the average cup of coffee served contains about 1.70 grains of caffeine and 2.30 grains of tannin. A very good cup of coffee is estimated to contain about 2.20 grains of caffeine and .30 grains of tannin. Caffeine is much more active than tannin, and more easily extracted, and under proper conditions almost all of the caffeine in the beans can be extracted, and a very small percentage of tannin, the undesirable element. Caffeine responds quickly to boiling water, while tannin is very slow acting, but continues to be extracted slowly from the grounds as long as the grounds are in water, no matter at what temperature; thus, if all the coffee grounds or sediment is not removed from the coffee as soon as the beverage or brew is completed, the tannin will continue to be active even after the coffee has been consumed. The production of the ideal cup of coffee therefore has been found to depend on; first, the use of boiling water at about 212° F.; second, the recovery of all caffeine; third, reduction in recovery of tannin as much as is possible, and; fourth, absolute elimination of all grounds and sediment from the resulting brew or beverage. The production of an ideal beverage is not as simple as it may seem, since as far as I am aware none of the present methods and apparatus serves to eliminate all grounds and sediment.

My present invention has for its purpose to provide a simple, durable, portable, and easily operated urn for the making of coffee for household and other uses and in its present form is electrically heated. In practice I provide two concentric containers the walls of which are separated and form a compartment therebetween for the resulting beverage. The inner container receives a suitable amount of water, and interposed in the top thereof is a container for the coffee grounds; a tube extends from the coffee container to the water and through which the steam is projected as the water is boiled so that it permeates the coffee, absorbs the desired constituents and passes out at the top through a filter, and over and down into the space between the containers which serves as a receptacle. The advantages of my structure and method reside in the production of a coffee beverage having a high percentage and recovery of caffeine and a low percentage of tannin, with no introduction of grounds or sediment into the beverage, which may be left standing in the urn for a long while without injury to its flavor or other properties. The grounds do not drain off into the resulting beverage.

Other and equally important objects of my invention will become apparent as the description of the same proceeds in greater detail, but interpretation of the scope of the invention should only be conclusive when made in the light of the subjoined claims.

In the drawings wherein I have illustrated a preferred form of my invention:—

Figure 1 is a vertical section of the assembly, and,

Figure 2 is a detail in section of the coffee ground container, and Figure 3 is a modified means of attaching the tube in place.

In the drawing like characters of reference are used to designate like or similar parts throughout the several views.

My coffee urn proper, which includes the outer container is designated (1) and is preferably cylindrical in form and has a side wall (2) and a bottom (3) which is extended down at (4) to receive footing elements (4ª); over the urn is a hinged top (5) with a central opening in which is seated a glass (or other material) dome element (6). In the urn, and spaced from the bottom (3) is a false bottom or partition (7) which carries a resistance element (8) in circuit as at (9)

with the plug (10) for heating the urn. Beneath the heating element is a base compartment or chamber (11). Seated on the part (7) or partition is an inner cylinder or container (12), between the wall (13) of which and the wall (2) of the urn or outer container is a space into which the completed beverage is delivered in the manner which will be hereinafter described.

The upper edge of the container (12) is formed with threads receiving companion threads (14) of a coffee container (15); there being a countersunk opening (16) in the bottom of (17) thereof to support the flanged upper end of a tube (18) which extends to a point adjacent to the bottom of the container (12) to receive steam and moisture from water in the container (12) when same has been raised to about 212° F. by the heating element (8). Over top of tube (18) a screen (28) is placed to prevent the coffee grounds from falling down through the tube. The top of the container (15) is open, but is peripherally flanged as at (19), and upon the flange (and after the coffee is inserted in the container) is placed a layer of filtering material (20) and on top of the filtering material is placed a foraminated plate (21), or a plate provided with a plurality of openings (22). The coffee container has screw threads adjacent its upper edge to be engaged by screwthreads (23) in a cover and condensation plate (24) provided with an upstanding central tube (25) which is extended up into the dome element (6). The urn has a suitable handle (26) and a mouth or pouring nozzle (27).

In operation, water is placed in the container (12), and the container (15) is filled with coffee, and the filter element (20) and plate (21) placed thereon; the top or cover (24) is then screwed into place, and the container (15) screwed into the top of container (12); the heating element (8) is then turned on. As the water is brought to about 212° F. pressure in the container (12) forces the water up in the tube (18); passes through the coffee in container (15) absorbing the desired products (but a very small amount of tannin), and passes up through the filter element (20) and plate (21) removing absolutely all grounds and sediment, and thence out through tube (25) and down upon the cover or condensing plate (24), whence it drips to the reservoir compartment between the two containers (12) and (1). Inspection of the process is obtained by watching the dome (6) wherein the discharge end of the tube (25) is observable. When the water in container (12) is boiled away no further action will be seen through the dome. It is to be noted that not only is the resulting beverage free from sediment and grounds, but the damp grounds in container (15) do not drip down into the beverage, but drip into the container (12), so that the beverage can be let stand without thereby gradually becoming impregnated with tannin and other undesirable products such as is now the case with utensils of this order.

While in the foregoing I have described such combination and arrangement of elements as constitute the preferred form of my invention, it is nevertheless manifest that changes may be made in the details without departing from the spirit thereof, and to that end it is emphasized that interpretation of the invention should only be conclusive when made in the light of the subjoined claims.

I claim:—

1. In a utensil for making coffee, of the type having a lid and a transparent dome element, and an inner and an outer container, the walls of which are spaced from each other to form a compartment for receiving completed coffee beverage; the inner compartment having an open top, a third compartment for receiving coffee removably retained in the open top of the inner compartment; said third compartment having a tube extending into the second compartment, a filter member placed over the third compartment, and a cover element on the third compartment having an upstanding discharge tube for vapors and moisture, said tube being so arranged that vapor and moisture emanating from the third compartment by reason of water boiling in the second compartment, discharges into the transparent dome element and passes therefrom into the compartment formed between the walls of the inner and outer containers.

2. In a utensil for making coffee, of the type having a receptacle for receiving water, and a lid and transparent dome element on the lid, a receptacle for receiving coffee grounds; the latter receptacle being arranged above the first and separably connected thereto, a tube communicating with both the upper and the lower receptacles at points adjacent the bottoms thereof, a filter means over the upper receptacle, a cover element forming a compartment above the filter means and having an upstanding tube rising therefrom, and an outer receptacle spaced from the upper and lower receptacles, said upper and lower receptacles being supported as a unit in the outer receptacle, and the tube rising from the compartment formed by the cover discharging into the transparent dome.

3. In a utensil for making coffee, of the type having a receptacle for receiving water, and a lid and transparent dome element in the lid, a receptacle for receiving coffee grounds, the receptacle for receiving coffee grounds being attached to the top of the receptacle for receiving water, a tube in the bottom of the upper or coffee receptacle extending into the lower or water receptacle, the coffee receptacle having an open top, a filter member over the open top, a plate over the filter member, a cover forming a compartment over the plate and having an upstanding tube rising therefrom and into the dome element in the lid, and an outer receptacle in which the aforementioned receptacles are contained, said outer receptacle being spaced from the walls of the other receptacles to provide a space for receiving completed coffee.

In testimony whereof, I affix my signature hereunto, August 10, 1929.

HARRY L. LAMBERT.